United States Patent
Ahn et al.

(10) Patent No.: US 10,279,420 B2
(45) Date of Patent: May 7, 2019

(54) RAPID MANUFACTURING PROCESS OF FERROUS AND NON-FERROUS PARTS USING PLASMA ELECTRON BEAM

(71) Applicant: INDUSTRY-ACADEMIC COOPERATION FOUNDATION, CHOSUN UNIVERSITY, Gwangju (KR)

(72) Inventors: Dong Gyu Ahn, Gwangju (KR); Ho Jin Lee, Gwangju (KR)

(73) Assignee: INDUSTRY-ACADEMIC COOPERATION FOUNDATION, CHOSUN UNIVERSITY, Gwangju (KR)

(*) Notice: Subject to any disclaimer, the term of this patent is extended or adjusted under 35 U.S.C. 154(b) by 245 days.

(21) Appl. No.: 15/333,539

(22) Filed: Oct. 25, 2016

(65) Prior Publication Data
US 2017/0120370 A1 May 4, 2017

(30) Foreign Application Priority Data
Oct. 28, 2015 (KR) .................. 10-2015-0150257

(51) Int. Cl.
| | |
|---|---|
| B23K 15/00 | (2006.01) |
| B33Y 10/00 | (2015.01) |
| B22F 1/00 | (2006.01) |
| B22F 3/105 | (2006.01) |
| B23K 15/06 | (2006.01) |
| B23K 103/02 | (2006.01) |
| B33Y 40/00 | (2015.01) |
| B23K 103/00 | (2006.01) |

(52) U.S. Cl.
CPC ........ *B23K 15/0086* (2013.01); *B22F 1/0085* (2013.01); *B22F 3/1055* (2013.01); *B23K 15/0093* (2013.01); *B23K 15/06* (2013.01); *B33Y 10/00* (2014.12); *B22F 2999/00* (2013.01); *B23K 2103/00* (2018.08); *B23K 2103/02* (2018.08); *B33Y 40/00* (2014.12); *Y02P 10/295* (2015.11)

(58) Field of Classification Search
CPC ............ B23K 15/0086; B23K 15/0093; B23K 15/06; B23K 10/00; B33Y 10/00; B33Y 40/00; B22F 1/0085; B22F 3/1055
USPC .................. 219/76.12, 73.11, 73.2; 264/485
See application file for complete search history.

(56) References Cited

U.S. PATENT DOCUMENTS

| | | | | |
|---|---|---|---|---|
| 4,376,886 A | * | 3/1983 | Sciaky | B23K 15/0053 219/121.14 |
| 5,284,526 A | * | 2/1994 | Garg | B01D 53/46 148/208 |

(Continued)

FOREIGN PATENT DOCUMENTS

| | | |
|---|---|---|
| JP | 2002-069507 | 3/2002 |
| JP | 2005-048234 | 2/2005 |
| JP | 2013-532592 | 8/2013 |

*Primary Examiner* — Jimmy Chou
(74) *Attorney, Agent, or Firm* — Lex IP Meister, PLLC

(57) ABSTRACT

Provided is a rapid manufacturing process of ferrous and non-ferrous parts using a plasma electron beam in which the plasma electron beam is workable even in a low vacuum pressure environment and has a relatively large radiation range, productivity of the process is improved as a high-power beam can be emitted to a ferrous and non-ferrous powder, and production costs are reduced due to low maintenance and manufacturing costs.

5 Claims, 5 Drawing Sheets

(56) References Cited

U.S. PATENT DOCUMENTS

| | | | | |
|---|---|---|---|---|
| 9,064,671 B2* | 6/2015 | Ljungblad | | H01J 29/52 |
| 2002/0000369 A1* | 1/2002 | Mohri | | B23H 1/04 |
| | | | | 204/192.12 |
| 2004/0228754 A1* | 11/2004 | Abe | | B22F 3/004 |
| | | | | 419/6 |
| 2010/0007062 A1* | 1/2010 | Larsson | | B22F 3/1055 |
| | | | | 264/485 |
| 2011/0089030 A1* | 4/2011 | Juliano | | B22D 11/0614 |
| | | | | 204/298.13 |
| 2013/0140279 A1* | 6/2013 | Bruck | | B23K 26/34 |
| | | | | 219/73.11 |
| 2013/0142965 A1* | 6/2013 | Bruck | | C23C 24/106 |
| | | | | 427/597 |
| 2015/0132173 A1* | 5/2015 | Bruck | | B23K 26/342 |
| | | | | 419/1 |
| 2015/0273622 A1* | 10/2015 | Manabe | | B23K 15/0086 |
| | | | | 219/76.1 |
| 2015/0336219 A1* | 11/2015 | Bruck | | B23K 9/042 |
| | | | | 427/142 |
| 2016/0045981 A1* | 2/2016 | Zurecki | | B23K 26/342 |
| | | | | 219/76.12 |
| 2016/0052079 A1* | 2/2016 | Ackelid | | B22F 3/1055 |
| | | | | 419/55 |
| 2016/0082511 A1* | 3/2016 | Cui | | B22F 5/04 |
| | | | | 420/448 |
| 2016/0083304 A1* | 3/2016 | Mironets | | C04B 35/10 |
| | | | | 264/497 |
| 2016/0158841 A1* | 6/2016 | Holcomb | | H05B 6/101 |
| | | | | 219/603 |
| 2016/0175929 A1* | 6/2016 | Colin | | C04B 35/62839 |
| | | | | 419/23 |
| 2016/0184891 A1* | 6/2016 | Mironets | | B22F 1/0096 |
| | | | | 419/53 |

\* cited by examiner

RAPID MANUFACTURING PROCESS OF FERROUS AND NON-FERROUS PARTS USING PLASMA ELECTRON BEAM

CROSS-REFERENCE TO RELATED APPLICATION

This application claims priority to and the benefit of Korean Patent Application No. 10-2015-0150257, filed on Oct. 28, 2015, the disclosure of which is incorporated herein by reference in its entirety.

BACKGROUND

1. Field of the Invention

The present invention relates to a rapid manufacturing process of ferrous and non-ferrous parts using a plasma electron beam, and more particularly, to a rapid manufacturing process of ferrous and non-ferrous parts using a plasma electron beam in which ferrous and non-ferrous three-dimensional (3D) parts may be rapidly manufactured by supplying a ferrous and non-ferrous powder onto a laminated plate, emitting a plasma electron beam, and repeating processes of preheating, melting and laminating, and remelting the ferrous and non-ferrous powder.

2. Discussion of Related Art

Recently, in manufacturing industries for products such as cars, aircrafts, molds, power generation parts, engine parts, and strategic parts and in medical industry, interest in a rapid manufacturing technique of special metal parts is increasing. Usually, a rapid manufacturing technique is a method of manufacturing parts by partially emitting an electron beam to a laminated material powder and melting and laminating the laminated material powder.

ARCAM AB Ltd. in Sweden has been developed a rapid manufacturing process (an electron beam melting (EBM) process) and a manufacturing system using an electron beam and a powder supply devices for a powder bed, is beginning to dominate the market, and is also seeking to expand its market. In the rapid manufacturing process (the EBM process) of ARCAM AB Ltd., a 3,500 Watt class hot-cathode electron beam is used as an electron beam and a high vacuum pressure beam preheating, melting, and laminating method is used. In addition, scattering of a material powder is controlled through base high-temperature heating and narrow-width electron beam heating. However, there is no remelting process of the material powder. A manufacturing rate ranges from about 55 cm$^3$ to 88 cm$^3$ per hour. Some materials such as Ti and CoCr are used as the powder.

ARCAM AB Ltd. has a patent, United States Unexamined Patent Application Publication No. 2014-0348691, having the title "Method and Apparatus for Additive Manufacturing." The above patent relates to a rapid manufacturing process in which parts are manufactured through near-net shape forming by preheating, melting and laminating using a hot-cathode electron beam.

In the Technical University (TU) of Munchen, basic research on a rapid manufacturing process for manufacturing metal parts for near-net shape forming using an electron beam sintering process is progressing. Beam power is about 10 kW, and materials such as H13 steel, H11 steel, CuSn20, FeNi, and NdFeB are used. The rapid manufacturing process of TU Munchen, which is a process of manufacturing parts through near-net shape forming by sintering a metal and non-metal powder using a hot-cathode electron beam, is a high vacuum pressure sintering and laminating method. There is no remelting process of the metal and non-metal powder and basic research on a process impact and mechanism analysis technique is progressing.

Sciaky Inc. in the United States has an electron beam welding (EBW)-based rapid manufacturing process technique. The rapid manufacturing process using EBW is a process in which a final shape is generated by mechanically processing a metal or non-metal after the metal or non-metal is welded using an electron beam. In this regard, Sciaky Inc. has a patent, U.S. Pat. No. 4,376,886, having the title "Method for Electron Beam Welding." The above patent, which relates to an EBW process, relates to a seam welding method using an electron beam.

InssTek Inc. in South Korea is developing a laser cladding-based metal three-dimensional (3D) printer. The 3D printer laminates materials in a laser cladding method, uses a fiber laser, and has a surface roughness of around 200 μm. Further, when the 3D printer is applied to a material having a high melting point, a production rate of parts is slow and there is a limitation in application.

Filed techniques in Korea related to rapid manufacturing process techniques will be described next.

A superalloy part and an apparatus and method for forming a coating thereon are disclosed in Korean Patent No. 10-0626777 which relates to a method of forming an insulation coating layer by physically depositing a ceramic on superalloy parts by using an electron beam.

Further, a real-time monitoring and controlling method for a height of a cladding layer using image photographing and image processing in laser classing and direct metal molding techniques are disclosed in Korean Patent Application Publication No. 10-2003-0039929 which relates to a measuring and controlling a height of a cladding layer by using image photographing and image processing in a laser surface modification technique such as laser surface alloying and laser cladding, and in a laser cladding-aided direct metal manufacturing technique. In the above invention disclosed in Korean Patent Application Publication No. 10-2003-0039929, a height of a cladding layer is adjusted by real-time monitoring a position and height of a molten pool and simultaneously controlling process variables.

As described above, in the conventional methods, a ferrous and non-ferrous powder is sintered or melted by using a hot-cathode electron beam. There is a disadvantage in that the hot-cathode electron beam requires frequent replacement of a Ti filament thereof, a laminating time of a metal layer is increased due to a limitation of beam power and a beam width, much equipment cost is caused due to a requirement of a high vacuum pressure environment, production costs are increased, and workability is degraded due to a lot of working time.

Further, in the conventional methods, since materials used are limited to three species in the Ti family and one species in the CoCr family and air holes are generated on surfaces of parts while the parts are manufactured, there is a disadvantage in that a quality of the parts, such as surface roughness, density, corrosion property, and hardness, is degraded.

SUMMARY OF THE INVENTION

The present invention is directed to a rapid manufacturing process of ferrous and non-ferrous parts using a plasma electron beam in which three-dimensional (3D) parts are manufactured by emitting a plasma electron beam to a ferrous and non-ferrous powder supplied onto a laminated plate or a metal layer and preheating, melting and laminating, and remelting the ferrous and non-ferrous powder.

According to an aspect of the present invention, there is provided a rapid manufacturing process of ferrous and non-ferrous parts using a plasma electron beam including a first supply step of supplying a ferrous and non-ferrous powder onto a laminated plate, a first preheating step of preheating, by a plasma electron beam, the ferrous and non-ferrous powder supplied onto the laminated plate, a first melting and laminating step of melting and laminating the ferrous and non-ferrous powder by emitting a plasma electron beam to a part of the preheated ferrous and non-ferrous powder so that a ferrous and non-ferrous layer is formed on the laminated plate when the first preheating step is completed, and a multi-layer laminating step of laminating a plurality of ferrous and non-ferrous layers so that parts having a predetermined shape are formed by repeating steps of supplying, preheating, and melting and laminating the ferrous and non-ferrous powder on the ferrous and non-ferrous layer. The multi-layer laminating step includes a second supply step of supplying the ferrous and non-ferrous powder onto the ferrous and non-ferrous layer so that a powder layer made of the ferrous and non-ferrous powder is formed on the ferrous and non-ferrous layer, a second preheating step of preheating the powder layer when the second supply step is completed, a second melting and laminating step of melting a part of the powder layer by emitting the plasma electron beam to the part of the powder layer so that another ferrous and non-ferrous layer is formed on the ferrous and non-ferrous layer when the second preheating step is completed, and a repeating step of repeating the second supply step, the second preheating step, and the second melting and laminating step so that the parts having the predetermined shape are formed on the laminated plate when the second melting and laminating step is completed.

Meanwhile, the process may further include a remelting step of remelting the ferrous and non-ferrous layers by emitting the plasma electron beam to the ferrous and non-ferrous layers so that thicknesses of the ferrous and non-ferrous layers are uniform and a surface roughness, density, corrosion property, and hardness are improved when the second melting and laminating step of the multi-layer laminating step is completed or the repeating step is completed.

The laminated plate may be heated to a predetermined temperature in the first preheating step, and a plasma electron beam having lower power and a wider width than power and a width of the plasma electron beam emitted to the ferrous and non-ferrous powder in the first melting and laminating step may be emitted to the ferrous and non-ferrous powder supplied onto the laminated plate.

In the second preheating step, a plasma electron beam having lower power and a wider width than power and a width of the plasma electron beam emitted to the powder layer in the second melting and laminating step may be emitted onto the powder layer.

Meanwhile, the repeating step may further include an additional melting step of remelting the ferrous and non-ferrous layers laminated in multiple stages by selectively emitting the plasma electron beam to the laminated ferrous and non-ferrous layers.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
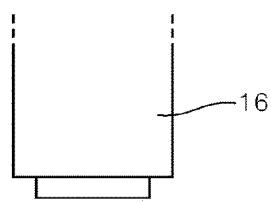
FIGS. 1 to 4 are cross-sectional views illustrating an operating state of a manufacturing apparatus to which a rapid manufacturing process of ferrous and non-ferrous parts using a plasma electron beam according to the present invention is applied.
Figure 1:
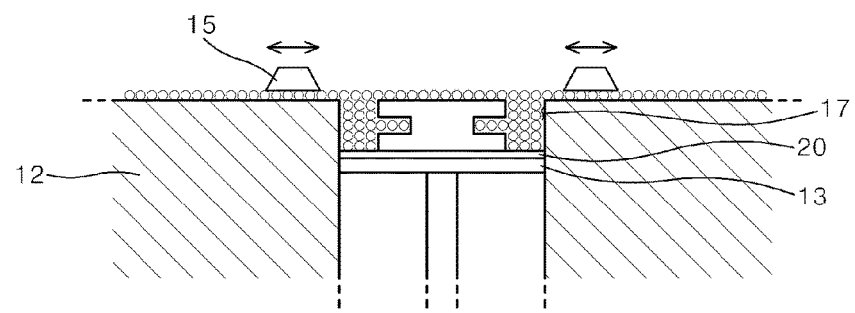

Hereinafter, a rapid manufacturing process of ferrous and non-ferrous parts using a plasma electron beam according to the present invention will be described in more detail with reference to the accompanying drawings.

FIGS. 1 to 4 are cross-sectional views illustrating an operating state of a manufacturing apparatus 10 to which a rapid manufacturing process of ferrous and non-ferrous parts using a plasma electron beam according to the present invention is applied.

Referring to the drawings, the manufacturing apparatus 10 includes a main body (not illustrated) including a vacuum chamber, an internal block 12, which is provided in the main body and includes a molding space 17 recessed downward from an upper surface thereof, a mounting plate 13, which is provided in the molding space 17 to be liftable and includes a laminated plate 20 mounted on an upper surface thereof, a lifting unit (not illustrated) which lifts the mounting plate 13, powder hoppers (not illustrated) which supply a ferrous and non-ferrous powder onto the internal block 12, a rake member 15, which is moved forward and backward in a direction adjacent to the molding space 17 on the internal block 12 and transfers the ferrous and non-ferrous powder to the molding space 17, and an electron gun 16, which is provided on the main body and emits a plasma electron beam to the molding space 17 of the internal block 12.

The molding space 17 is preferably formed to have a rectangular cross section, and the mounting plate 13 is preferably formed to have a cross section corresponding to the molding space 17. Although the lifting unit is not illustrated in the drawings, a cylinder which extends in a vertical direction may be applied to the lifting unit.

Meanwhile, although the mounting plate 13 is not illustrated in the drawings, a heating member is provided to heat the laminated plate 20 mounted on the upper surface thereof. The heating member includes a plurality of heating elements which are provided on the mounting plate 13 and are heated by power supplied from the outside.

The powder hoppers are provided in the main body at positions opposite to each other with respect to the molding space 17, and accommodation spaces that may accommodate a large amount of the ferrous and non-ferrous powder are formed in the powder hoppers. Further, the powder hoppers have outlets formed on a bottom thereof to discharge the ferrous and non-ferrous powder to the internal block 12, and the outlets are opened and closed by an opening and closing means (not illustrated).

A plurality of rake members 15 are formed to have a predetermined width, and are provided on the internal block 12 at positions opposite each other with respect to the molding space 17. The rake members 15 are provided in the main body to move in a direction adjacent to each other or away from each other. The rake member 15 is reciprocated by a transfer driving unit, and although the transfer driving unit is not illustrated in the drawings, the transfer driving unit is preferably formed as a cylinder of which one end is provided at the rake member 15, the other end is supported by the main body, and both ends extend.

The electron gun 16, which emits a plasma electron beam to the molding space 17, is formed so that an irradiation position of the plasma electron beam may be moved in forward, backward, left, and right directions. Since the electron gun 16 is a conventionally and generally used electron gun 16, a detailed description thereof will be omitted.

Meanwhile, the rapid manufacturing process of ferrous and non-ferrous parts using a plasma electron beam according to the present invention will be described next. The rapid manufacturing process of ferrous and non-ferrous parts using a plasma electron beam includes a first supply step, a first preheating step, a first melting and laminating step, a multi-layer laminating step, a checking step, and a remelting and laminating step.

The first supply step is a step of supplying a ferrous and non-ferrous powder onto the laminated plate 20. The laminated plate 20 is mounted on the upper surface of the mounting plate 13 positioned in the molding space 17, and the lifting unit is operated so that the laminated plate 20 is positioned at a position at which the laminated plate 20 is inserted into the upper surface of the internal block 12 to a predetermined depth.

Next, an operator opens the outlets of the powder hoppers to supply the ferrous and non-ferrous powder onto the internal block 12, and moves the rake members 15 in the direction adjacent to each other to forcibly transfer the ferrous and non-ferrous powder into the molding space 17. In this case, the ferrous and non-ferrous powder supplied onto an upper surface of the laminated plate 20 is formed as a ferrous and non-ferrous powder layer having a flat upper surface by the rake members 15 adjacent to each other.

In this case, a Co, Ni, and Fe-based superalloy material and a high-temperature material such as Ti are preferably used as the ferrous and non-ferrous powder.

The first preheating step is a step of preheating the ferrous and non-ferrous powder supplied onto the laminated plate 20. In this case, the operator operates the heating member provided on the mounting plate 13 to heat the laminated plate 20 to a predetermined temperature. Further, a plasma electron beam is emitted to the ferrous and non-ferrous powder supplied onto the laminated plate 20 through the electron gun 16. In this case, a plasma electron beam having lower power and a wider width than power and a width of a plasma electron beam emitted to the ferrous and non-ferrous powder in the first melting and laminating step is preferably emitted to the ferrous and non-ferrous powder supplied onto the laminated plate 20.

Since the ferrous and non-ferrous powder is preheated in the above-described first preheating step before the ferrous and non-ferrous powder is melted, there is an advantage in that scattering of the ferrous and non-ferrous powder while laminating the ferrous and non-ferrous powder may be minimized.

The first melting and laminating step is a step of melting the ferrous and non-ferrous powder by emitting the plasma electron beam to a part of the preheated ferrous and non-ferrous powder so that a ferrous and non-ferrous layer is formed on the laminated plate 20 when the first preheating step is completed. The electron gun 16 changes an irradiation position of the ferrous and non-ferrous powder according to an input shape of parts, and emits the plasma electron beam to the ferrous and non-ferrous powder.

In this case, since the plasma electron beam is emitted with power ranging from 4 KW to 5 KW and an irradiation width with respect to the ferrous and non-ferrous powder ranges from 0 5 mm to 2 mm, there is an advantage in that the plasma electron beam is widely emitted with high power compared to a hot-cathode electron beam and workability is improved.

The multi-layer laminating step is a step of laminating a plurality of ferrous and non-ferrous layers so that parts having a predetermined shape are formed by repeating steps of supplying and melting the ferrous and non-ferrous powder onto the ferrous and non-ferrous layer and includes a second supply step, a second preheating step, a second melting and laminating step, and a repeating step.

Figure 3:
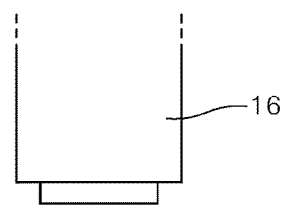
Figure 3:
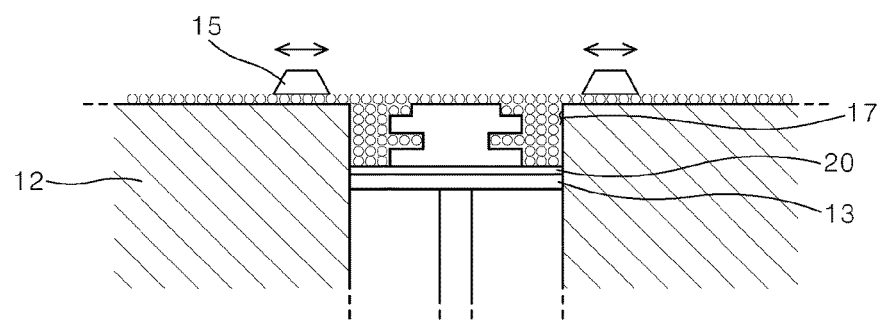

The second supply step is a step of supplying the ferrous and non-ferrous powder onto the ferrous and non-ferrous layer so that a ferrous and non-ferrous powder layer made of the ferrous and non-ferrous powder is formed on the ferrous and non-ferrous layer. Referring to FIG. 1 or 3, the operator operates the lifting unit to move the laminated plate 20 to a lower side thereof so that the ferrous and non-ferrous powder is laminated onto the ferrous and non-ferrous layer. Next, the outlets of the powder hoppers are opened and the ferrous and non-ferrous powder is supplied onto the internal block 12. When the supply of the ferrous and non-ferrous powder is completed, the rake members 15 are moved in the direction adjacent to each other to forcibly transfer the ferrous and non-ferrous powder into the molding space 17. In this case, the ferrous and non-ferrous powder supplied onto the ferrous and non-ferrous layer is formed as a powder layer having a flat upper surface by the rake members 15 adjacent to each other.

The second preheating step is a step of preheating the ferrous and non-ferrous powder layer when the second supply step is completed. The operator preheats the ferrous and non-ferrous powder layer by emitting a plasma electron beam to the ferrous and non-ferrous powder layer through the electron gun 16. In this case, a plasma electron beam having lower power and a wider width than the power and the width of the plasma electron beam used in the first melting and laminating step or the second melting and laminating step is preferably emitted. Since the ferrous and non-ferrous powder is preheated in the above-described second preheating step before the ferrous and non-ferrous powder is melted, there is an advantage in that scattering of the ferrous and non-ferrous powder may be minimized.

Figure 2:
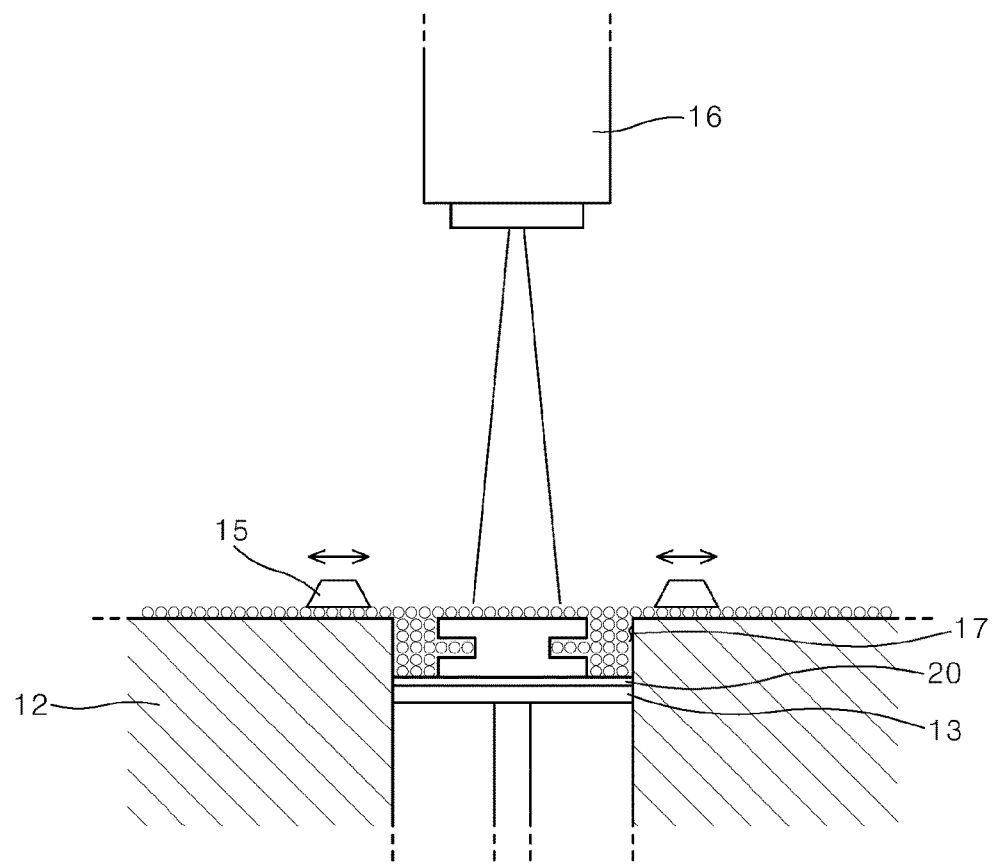
Figure 4:
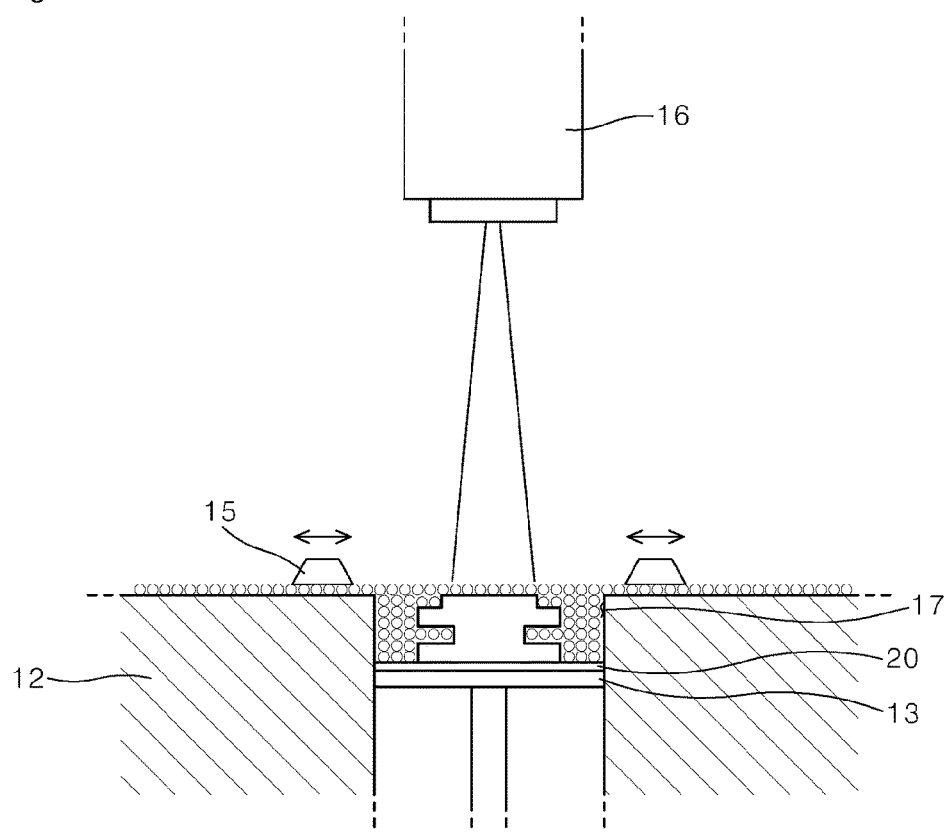
Figure 5:
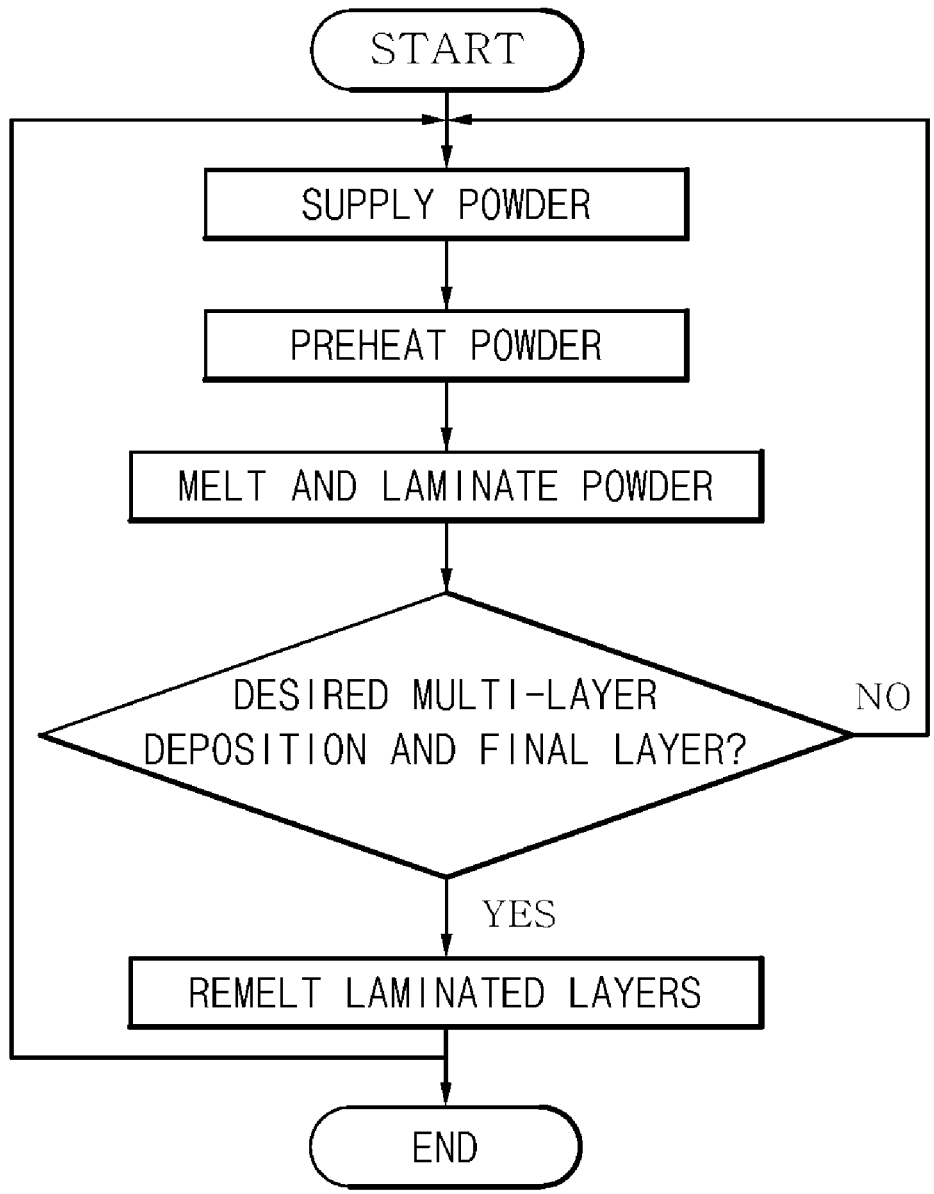
FIG. 5 is a flowchart illustrating the rapid manufacturing process of ferrous and non-ferrous parts using a plasma electron beam according to the present invention.

The second melting and laminating step is a step of melting the ferrous and non-ferrous powder layer by emitting a plasma electron beam to a part of the ferrous and non-ferrous powder layer so that another ferrous and non-ferrous layer is formed on the ferrous and non-ferrous layer when the second preheating step is completed. Referring to FIG. 2 or 4, the plasma electron beam is emitted to the ferrous and non-ferrous powder layer through the electron gun 16 according to the input shape of the part. In this case, since the plasma electron beam is emitted with power ranging from 4 KW to 5 KW and the irradiation width with respect to the ferrous and non-ferrous powder ranges from 0.5 mm to 2 mm, there is the advantage in that the plasma electron beam is widely emitted with high power compared to the hot-cathode electron beam and workability is improved.

The repeating step is a step of repeating the second supply step, the second preheating step, and the second melting and laminating step so that parts having a predetermined shape are formed on the laminated plate 20 when the second melting and laminating step is completed.

Meanwhile, although the repeating step is not illustrated in the drawing, the repeating step may further include an additional melting step of remelting the ferrous and non-ferrous layers by selectively emitting a plasma electron beam to the ferrous and non-ferrous layers so that thicknesses of the ferrous and non-ferrous layers are uniform, and a surface roughness, density, corrosion property, and hardness may be improved. The above-described additional melting step may be performed or ignored according to an operating state of the ferrous and non-ferrous layers.

In the checking step, a surface quality of the ferrous and non-ferrous layers, that is, the surface roughness, density, corrosion property, and hardness, are checked before the remelting step. The remelting step is performed when the surface quality of the ferrous and non-ferrous layers is a predetermined reference or more, and the second supply step, the second preheating step, and the second melting and laminating step are repeated when the surface quality of the ferrous and non-ferrous layers is less than the predetermined reference. In this case, the operator may check the surface quality of the ferrous and non-ferrous layers using a separate surface quality inspection apparatus such as a vision sensor.

The remelting step is a step of remelting the ferrous and non-ferrous layers by emitting a plasma electron beam to the ferrous and non-ferrous layers when the multi-layer laminating step is completed. The operator emits the plasma electron beam to an uppermost ferrous and non-ferrous layer or emits the plasma electron beam to surfaces of the ferrous and non-ferrous layers after removing the ferrous and non-ferrous powder from the ferrous and non-ferrous layers. In this case, the electron beam is preferably emitted with power ranging from 4 KW to 5 KW.

Since the plasma electron beam is re-emitted to the surfaces of the ferrous and non-ferrous layers manufactured in the remelting step, uniformity of the ferrous and non-ferrous layers is improved and density thereof is increased. Further, there is an advantage in that the surface roughness of the ferrous and non-ferrous layers is improved to around 20 μm and an amount of post-processing is minimized Meanwhile, the remelting step may be performed after the second melting and laminating step of the multi-layer laminating step.

In the above-described rapid manufacturing process of ferrous and non-ferrous parts using a plasma electron beam according to the present invention, since the plasma electron beam is emitted to the ferrous and non-ferrous powder supplied onto the laminated plate 20 or the ferrous and non-ferrous layer, there is an advantage in that the plasma electron beam is workable even in a low vacuum pressure environment and has a relatively large radiation range, productivity of the process is improved as a high-power beam can be emitted to the ferrous and non-ferrous powder, and production costs are reduced due to low maintenance and manufacturing costs as compared to a case of a hot-cathode electron beam.

In the rapid manufacturing process of ferrous and non-ferrous parts using a plasma electron beam according to the present invention, since the plasma electron beam is emitted to the ferrous and non-ferrous powder supplied onto the laminated plate or the ferrous and non-ferrous layer, there is the advantage in that the plasma electron beam is workable even in a low vacuum pressure environment and has a relatively large radiation range, productivity of the process is improved as a high-power beam can be emitted to the ferrous and non-ferrous powder, and production costs are reduced due to low maintenance and manufacturing costs as compared to the case of a hot-cathode electron beam.

In addition, since the ferrous and non-ferrous layers are remelted by emitting the plasma electron beam to the ferrous and non-ferrous layers laminated in multiple stages, characteristic uniformity and density of the laminated ferrous and non-ferrous layers can be improved, surface roughness can be improved, an amount of post-processing can be reduced, and surface hardness and corrosion resistance can be improved.

While the present invention has been described with reference to exemplary embodiments illustrated in the accompanying drawings, these embodiments should be considered in a descriptive sense only and it should be understood by those skilled in the art that various alterations and equivalent other embodiment may be made.

Therefore, the scope of the present invention is defined by the appended claims.

What is claimed is:

1. A rapid manufacturing process of ferrous and non-ferrous parts using a plasma electron beam, the process comprising:
    a first supply step of supplying a ferrous and non-ferrous powder onto a laminated plate;
    a first preheating step of preheating, by a plasma electron beam, the ferrous and non-ferrous powder supplied onto the laminated plate;
    a first melting and laminating step of melting and laminating the ferrous and non-ferrous powder by emitting a plasma electron beam to a part of the preheated ferrous and non-ferrous powder so that a ferrous and non-ferrous layer is formed on the laminated plate when the first preheating step is completed; and
    a multi-layer laminating step of laminating a plurality of ferrous and non-ferrous layers so that parts having a predetermined shape are formed by repeating steps of supplying, preheating, and melting and laminating the ferrous and non-ferrous powder on the ferrous and non-ferrous layer,
    wherein the multi-layer laminating step includes:
    a second supply step of supplying the ferrous and non-ferrous powder onto the ferrous and non-ferrous layer so that a powder layer made of the ferrous and non-ferrous powder is formed on the ferrous and non-ferrous layer;
    a second preheating step of preheating the powder layer when the second supply step is completed;
    a second melting and laminating step of melting a part of the powder layer by emitting the plasma electron beam to the part of the powder layer so that another ferrous and non-ferrous layer is formed on the ferrous and non-ferrous layer when the second preheating step is completed; and
    a repeating step of repeating the second supply step, the second preheating step, and the second melting and laminating step so that the parts having the predetermined shape are formed on the laminated plate when the second melting and laminating step is completed; and
    a remelting step of remelting the ferrous and non-ferrous layers by emitting the plasma electron beam to the ferrous and non-ferrous layers so that thicknesses of the ferrous and non-ferrous layers are uniform and a surface roughness, density, corrosion property, and hardness are improved when the second melting and laminating step of the multi-layer laminating step is completed or the repeating step is completed.

2. A rapid manufacturing process of ferrous and non-ferrous parts using a plasma electron beam, the process comprising:
- a first supply step of supplying a ferrous and non-ferrous powder onto a laminated plate;
- a first preheating step of preheating, by a plasma electron beam, the ferrous and non-ferrous powder supplied onto the laminated plate;
- a first melting and laminating step of melting and laminating the ferrous and non-ferrous powder by emitting a plasma electron beam to a part of the preheated ferrous and non-ferrous powder so that a ferrous and non-ferrous layer is formed on the laminated plate when the first preheating step is completed; and
- a multi-layer laminating step of laminating a plurality of ferrous and non-ferrous layers so that parts having a predetermined shape are formed by repeating steps of supplying, preheating, and melting and laminating the ferrous and non-ferrous powder on the ferrous and non-ferrous layer, wherein the multi-layer laminating step includes:
- a second supply step of supplying the ferrous and non-ferrous powder onto the ferrous and non-ferrous layer so that a powder layer made of the ferrous and non-ferrous powder is formed on the ferrous and non-ferrous layer;
- a second preheating step of preheating the powder layer when the second supply step is completed;
- a second melting and laminating step of melting a part of the powder layer by emitting the plasma electron beam to the part of the powder layer so that another ferrous and non-ferrous layer is formed on the ferrous and non-ferrous layer when the second preheating step is completed; and
- a repeating step of repeating the second supply step, the second preheating step, and the second melting and laminating step so that the parts having the predetermined shape are formed on the laminated plate when the second melting and laminating step is completed wherein, in the second preheating step, a plasma electron beam having lower power and a wider width than power and a width of the plasma electron beam emitted to the powder layer in the second melting and laminating step is emitted to the powder layer.

3. The process of claim 1, further comprising a checking step of checking a surface quality of the ferrous and non-ferrous layers before the remelting step, performing the remelting step when the surface quality of the ferrous and non-ferrous layers is a predetermined reference or more, and repeating the second supply step, the second preheating step, and the second melting and laminating step when the surface quality of the ferrous and non-ferrous layers is less than the predetermined reference.

4. The process of claim 1, the repeating step further includes an additional melting step of remelting the ferrous and non-ferrous layers laminated in multiple stages by selectively emitting the plasma electron beam to the laminated ferrous and non-ferrous layers.

5. The process of claim 1, wherein, in the second preheating step, a plasma electron beam having lower power and a wider width than power and a width of the plasma electron beam emitted to the powder layer in the second melting and laminating step is emitted to the powder layer.

* * * * *